United States Patent
Kalén

(10) Patent No.: US 8,423,199 B2
(45) Date of Patent: Apr. 16, 2013

(54) METHOD AND DEVICE FOR CONTROLLING OPERATION OF A POWER SUPPLY SYSTEM

(75) Inventor: Hans Kalén, Soederkoeping (SE)

(73) Assignee: Flexenclosure AB, Lidkoping (SE)

( * ) Notice: Subject to any disclaimer, the term of this patent is extended or adjusted under 35 U.S.C. 154(b) by 304 days.

(21) Appl. No.: 12/735,389

(22) PCT Filed: Jan. 22, 2009

(86) PCT No.: PCT/EP2009/000398
§ 371 (c)(1),
(2), (4) Date: Oct. 28, 2010

(87) PCT Pub. No.: WO2009/092587
PCT Pub. Date: Jul. 30, 2009

(65) Prior Publication Data
US 2011/0040418 A1    Feb. 17, 2011

(30) Foreign Application Priority Data

Jan. 23, 2008 (EP) .................................... 08150566

(51) Int. Cl.
 G06F 1/26 (2006.01)
 F03D 9/02 (2006.01)
 H01M 10/46 (2006.01)
(52) U.S. Cl.
 USPC .............. 700/297; 700/291; 455/273; 307/66
(58) Field of Classification Search .................. 700/286, 700/291, 295, 297; 455/572–574; 320/128, 320/134; 307/64, 66
 See application file for complete search history.

(56) References Cited

U.S. PATENT DOCUMENTS

| | | | |
|---|---|---|---|
| 2003/0047209 A1* | 3/2003 | Yanai et al. | 136/291 |
| 2007/0132433 A1* | 6/2007 | Hehmann et al. | 323/214 |
| 2007/0191076 A1* | 8/2007 | Hageman et al. | 455/574 |

FOREIGN PATENT DOCUMENTS

| | | |
|---|---|---|
| DE | 10 2005 002 928 | 7/2006 |
| EP | 1 330 009 | 7/2003 |
| WO | WO 2005/060287 | 6/2005 |
| WO | WO 2005/101641 | 10/2005 |

* cited by examiner

*Primary Examiner* — Jeffrey A Gaffin
*Assistant Examiner* — Steven Garland
(74) *Attorney, Agent, or Firm* — Harness, Dickey & Pierce, P.L.C.

(57) ABSTRACT

A method for controlling a power supply system (10) supplying power to a power consuming device (17). The system comprising a climate-dependent source (5, 6) of electrical energy, an auxiliary source (7) of electrical energy, and an energy storage device (14) for storing electrical energy. The climate-dependent source and the energy storage device being connectable to the power consuming device (17). The method comprising acquiring (101) power consumption data indicative of expected future power consumption of the power consuming device (17), energy storage data indicative of a current energy storage level of the energy storage device (14), and power supply data indicative of a current supply of electrical power from the climate-dependent source (5, 6). Determining (102), based on the power consumption data, energy storage data and power supply data, an energy storage threshold level at which electrical energy should be supplied to the energy storage device (14).

18 Claims, 3 Drawing Sheets

METHOD AND DEVICE FOR CONTROLLING OPERATION OF A POWER SUPPLY SYSTEM

TECHNICAL FIELD OF THE INVENTION

The present invention relates to a method for controlling operation of a power supply system, to a controller comprised in a power supply system and to such a power supply system.

TECHNICAL BACKGROUND

Today, electrical power is frequently required in parts of the World where a reliable supply of electrical power is lacking. For example, electrical power may be temporarily required in connection with relief efforts, or may be more or less permanently required in remote and/or hard to reach locations for, for example, powering telecommunication equipment in a wireless communication network.

Especially in the latter case, the devices needing power should, furthermore, operate reliably over time so as to enable the communication service provider to provide substantially uninterrupted service.

Traditionally, such telecommunication equipment, for example base stations, has been powered using diesel generators. This approach is, however, neither cost-efficient nor environmentally friendly, since a substantial amount of fuel is consumed and, consequently, green house gases are emitted into the atmosphere. Moreover, fuel must regularly be transported to the, frequently quite inaccessible, base station locations.

Attempts have been made to reduce the cost of operating remotely located base stations by providing them with wind and/or solar power in addition to the diesel generator. Such system are, however, not in widespread use due to the relatively high investment cost and often continued need for frequent fuel transports, which may be at least partly attributed to a lack of a sufficiently sophisticated control system for the power supply.

SUMMARY OF THE INVENTION

In view of the above-mentioned and other drawbacks of the prior art, a general object of the present invention is to enable more cost-efficient and environmentally friendly operation of electrical equipment in remote locations, and in particular to provide an improved control of a power supply system including a climate-dependent source of electrical energy and an auxiliary source of electrical energy.

According to a first aspect of the present invention, these and other objects are achieved through a method for controlling operation of a power supply system for supplying electrical power to a power consuming device, the power supply system comprising a climate-dependent source of electrical energy, an auxiliary source of electrical energy, and an energy storage device in electrical connection with the sources of electrical energy for storing electrical energy generated thereby, at least the climate-dependent source and the energy storage device being connectable to the power consuming device for supplying electrical energy thereto, wherein the method comprises the steps of acquiring power consumption data indicative of an expected future power consumption of the power consuming device, energy storage data indicative of a current energy storage level of the energy storage device, and power supply data indicative of a current supply of electrical power from the climate-dependent source of electrical energy; supplying, if insufficient power is available from the climate-dependent source, electrical power from the energy storage device to the power consuming device; and determining, based on the acquired power consumption data, energy storage data and power supply data, an energy storage threshold level at which electrical energy should be supplied to the energy storage device to enable operation of the power consuming device.

It should be noted that the method according to the present invention by no means is limited to performing the steps thereof in any particular order.

The power-consuming device may be any device that requires a supply of electrical power for its operation. According to a currently preferred embodiment of the present invention, the power-consuming device is telecommunication equipment comprised in a base station in a wireless communication network.

By "climate-dependent source of electrical energy" should be understood any power source capable of converting locally available natural forces to electrical energy. Examples of such climate-dependent sources of electrical energy consequently include photovoltaic cells, wind turbines, wave-power devices, hydroelectric power devices, etc.

The "auxiliary source of electrical energy" is typically a power source that is not directly dependent on the locally available natural forces. Examples of such auxiliary sources include the electrical power grid (which may be unreliable), combustion motor based generators, such as diesel/biofuel generators etc.

The energy storage device may be any device capable of storing electrical energy, such as one or several batteries of various kinds (Pb-batteries, Li-ion batteries etc) or capacitor(s).

The "power consumption data" may be any data from which an estimation of an expected future power consumption of the power-consuming device can be deduced. For example, the power consumption data may be at least two samples of the instantaneous power consumption of the power-consuming device, the samples being separated in time. Alternatively, the power consumption data may be an externally generated power consumption profile which, in the exemplary case of telecommunication equipment in a base station, may have been supplied by the operator of the wireless telecommunication network.

The "energy storage data" may, for example, be provided in the form of voltage and current. The relative energy storage level can then be determined in a manner known to the skilled person. For example, the relative charge level of various energy storage devices can be determined from the voltage difference between the voltage before and the voltage after applying a load to the energy storage device. Furthermore, the deduced energy storage level may be an absolute or a relative storage/charging level of the energy storage device.

By "power supply data" should be understood any data from which the power supply of the climate-dependent source of electrical power can be deduced. For example, the voltage drop over a known resistance may be used to determine the power.

The present invention is based on the realization that environmentally friendly, reliable and economically advantageous operation of a power-consuming device, such as telecommunication equipment in a base station in a wireless communication network, can be achieved by using knowledge about predicted power consumption and available climate-dependent power supply for determining when to charge the energy storage device.

Based on the characteristics of the power-consuming device, the power supply system is typically dimensioned for a ratio between the average power supplied by the climate-dependent power source and the auxiliary power source. In practice, the ratio arrived at represents an optimum trade-off between initial investment and cost of operation given the environmental conditions at the site of installation.

More particularly, the maximum capacity of the climate-dependent power source, such as a solar panel and/or a wind turbine, the storage capacity of the energy storage device and the maximum capacity of the auxiliary power source are adapted to enable economically advantageous operation of the power-consuming device given the environmental conditions at the site of installation.

For a minimum cost of operation at a remotely located installation site, all of the power supplied to the power-consuming device should ideally originate from the climate-dependent power source. Dimensioning the power supply system to ensure this would, however, often result in a too high initial investment, at least with currently available technology.

When, however, reducing the maximum capacity of the climate-dependent power source to reduce the initial investment, the cost of operation will typically increase due to the resulting need for a higher capacity auxiliary power source, which generally requires relatively frequent maintenance and/or re-fuelling, especially when provided in the form of a combustion engine based generator.

The dimensioning of the power supply system thus results in a maximum capacity of the climate-dependent power source and a maximum energy storage capacity of the energy storage device, and is based upon the assumption that the power supply system can be controlled to keep the maximum average relative amount of energy supplied from the auxiliary power source to a sufficiently low level in order to keep the cost of operation at such a low level that the higher initial investment is justified.

This can be achieved using the method according to the present invention. For example, the power supply system can be controlled in such a way that climate-dependent power is always used when available. When more climate-dependent power is available than is required to operate the power-consuming device, excess climate-dependent power may be stored using the energy storage device. When the power supplied by the climate-dependent power source(s) is insufficient to power the power-consuming device, the energy storage device is used to power the power-consuming device. When the amount of energy stored in the energy storage device has been reduced to a certain threshold level, power will be supplied thereto to charge the energy storage device.

The present inventor has realized that this threshold level may be set dynamically based on the acquired knowledge about the predicted demand of energy, the supply of climate-dependent energy and the amount of stored energy. For example, the threshold level may be lowered if the predicted demand of energy is low. Hereby, less or even no power may need to be supplied from the auxiliary power source, since renewed supply of climate-dependent power may become available before the lowered threshold level is reached (for example, the sun may rise and electrical power thus be generated by a solar panel). Furthermore, the acquired knowledge about the predicted demand of energy, the supply of climate-dependent energy and the amount of stored energy, can be used to control/schedule the auxiliary power source to supply power in an optimal manner. In case of the auxiliary power source being a diesel/biofuel generator, this generator can be scheduled to run at maximum efficiency settings with as few starts per year as possible, which reduces fuel consumption and increases the life of the generator as compared to conventional power supply systems, in which the generator often runs far below its optimum power output and/or intermittently with frequent starts.

The control of the auxiliary power source may, furthermore, advantageously be based upon additional predefined requirements, such as maximum charge/discharge currents for the energy storage device. If the energy storage device is provided in the form of the currently favored (for cost reason) Pb-based batteries, limiting the charge/discharge currents will considerably increase the lifetime of the batteries. Further requirements may include the maximum operational temperature of the energy storage device etc.

It should be noted that, according to the various aspects of the present invention, no control of the operation of the power consuming device, and thus no control of the power consumption thereof, is required. The energy storage threshold level at which electrical energy should be supplied to the energy storage device is thus determined to enable future operation of the power consuming device without controlling the operation of the power consuming device.

In this context, the method for powering telecommunication equipment described in US 2007/0191076 should be mentioned. According to the method described therein, a power budget, which is determined based on a power criterion, is used to dynamically control the operation of the telecommunication equipment that is powered in such a way that the required power does not exceed the power budget. A purpose of the method disclosed in US 2007/0191076 is to eliminate the need for an auxiliary or redundant power source and instead fit the power consumption of the telecommunication equipment to the amount of available power.

Although providing a flexible and efficient powering of telecommunication equipment, the method disclosed in US 2007/0191076 requires the operation of the power-consuming equipment to be controlled in detail by the power management system. This is not always possible and/or convenient, and may lead to increased lead-times for installation and increased cost and time for development of the power supply system and/or the telecommunication equipment.

In addition to the above-mentioned power consumption data, energy storage data and power supply data, the energy storage threshold may be determined based on at least one additional criterion.

An example of such an additional criterion may be the total operational expense of the power supply system, which may, for example, be controlled by balancing the service life of the energy storage device against the supply of power from the auxiliary source of electrical energy. For instance, the energy storage threshold may then additionally be determined based on a known relation between the discharge ratio and the service life of the energy storage device.

It may, for example be determined that it is economically favorable to increase the service life of the energy storage device by further use of the auxiliary source of electrical energy. In that case, the energy storage threshold may be set higher, resulting in a lower discharge ratio of the energy storage device and thus in an increased service life thereof at the cost of increased use of the auxiliary source of electrical energy.

Alternatively, it may be determined that it is more economically favorable to deliberately shorten the service life of the energy storage device and reduce the use of the auxiliary source of electrical energy. In that case, the energy storage threshold may be set lower, resulting in a higher discharge ratio of the energy storage device and thus in a shortened service life thereof.

According to one embodiment, the method according to the present invention may further comprise the step of acquiring data indicative of an expected future supply of electrical power from the climate-dependent source of electrical energy.

Such data may be based on previously and/or continuously measured climate data, which may, for example, include solar radiation power, wind conditions etc. Moreover, the climate data may be measured directly, using appropriate sensors, or indirectly, via the power generation of the climate-dependent power source(s).

Using a thus provided power supply forecast, the power supply from the auxiliary power source can be scheduled with improved accuracy, whereby further improved performance and cost of operation can be achieved.

At times when excess climate-dependent power is available (the wind conditions are good and/or the solar radiation is intense) and the energy storage device is unable to receive more charge and/or is charged at the maximum charge current, the excess climate-dependent power may advantageously be used to power an internal climate control system comprised in the power supply system to store thermal energy in structures comprised in the power supply system and/or the power-consuming device.

In embodiments where the energy storage device is provided in the form of batteries having a substantial thermal mass, the batteries may advantageously be cooled using the excess climate-dependent power. This stored thermal energy can then be used to delay or dispense with supply of auxiliary power.

The method according to the present invention may, furthermore, advantageously comprise the step of controlling the power consumption of the power supply system based on the acquired data. The power supply system typically includes various devices that consume power, such as converters, regulators, sensors, acquisition units, processing units, etc. When required, such devices may be selectively shut down or be put in a standby mode in order to achieve a more favorable scheduling of the auxiliary power source and/or to channel the available power to the power-consuming device powered by the power supply system.

Moreover, in cases when the energy storage device of the power supply system comprises a plurality of sub-units, the method according to the present invention may advantageously further include the step of individually controlling each of those sub-units. In particular, the charge and/or discharge of the sub-units may be controlled, whereby all the sub-units can be used optimally. For example, sub-units having a higher charge level can be controlled to charge sub-units having a lower charge level to achieve a more even charge level, which may be advantageous for the efficiency and/or overall life of the energy storage device.

According to a second aspect of the present invention, the above-mentioned and other objects are achieved through a controller for controlling a power supply system comprising a climate-dependent source of electrical energy, an auxiliary source of electrical energy, and an energy storage device in electrical connection with the sources of electrical energy for storing electrical energy generated thereby, at least the climate-dependent source and the energy storage device being connectable to the power consuming device for supplying electrical energy thereto, the controller having at least one input for receiving power consumption data indicative of an expected future power consumption of the power consuming device, energy storage data indicative of an energy storage level of the energy storage device and power supply data indicative of a supply of electrical power from the climate-dependent source of electrical energy; processing circuitry adapted to determine, based on the acquired power consumption data, energy storage data and power supply data, an energy storage threshold level at which electrical energy should be supplied to the energy storage device to enable operation of the power consuming device; and at least one output for sending control signals to the sources of electrical energy.

The controller may be provided in the form of hardware, software or a combination thereof, and the method according to the first aspect of the present invention may be embodied in hardware in the controller, as a computer program adapted to run on a microprocessor comprised in the controller, or as a combination thereof.

The controller may have one input for receiving the various data on which the generation of the control signal is based via a serial data bus, such as RS232 or I2C, and/or may have inputs dedicated to receive certain parameters or certain data.

Furthermore, the controller may have additional outputs to enable control of sub-units, such as battery sub-units, comprised in the energy storage device for enabling individual control of the charging and/or discharging of the sub-units.

Moreover, the controller according to the present invention may advantageously be included in a power supply system for supplying electrical power to a power consuming device, the power supply system further comprising: a climate-dependent source of electrical energy connectable to the power consuming device for supplying electrical energy thereto; an auxiliary source of electrical energy connectable to the power consuming device for supplying electrical energy thereto; and an energy storage device that is in electrical connection with the sources of electrical energy for storing electrical energy generated thereby, and connectable to the power consuming device for supplying stored electrical energy thereto.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF A PREFERRED EMBODIMENT OF THE INVENTION

In the present detailed description, various embodiments of the control method, controller and power supply system according to the present invention are mainly discussed with reference to a power supply system comprised in a shelter for a base station to be deployed in a wireless communication network. It should be noted that this by no means limits the scope of the present invention, which is equally applicable to a power supply system for any other use, such as for powering equipment during a relief operation.

Furthermore, reference is mainly made to a power supply system including a photovoltaic solar panel, a particular wind turbine, a diesel/biofuel generator, and Pb-based batteries. As is, however, evident to the person skilled in the relevant art, the teachings of the present invention are equally applicable to power supply systems utilizing other types of climate-dependent power sources, such as wave-power sources, and auxiliary power sources, such as an electric power grid.

Figure 1A:
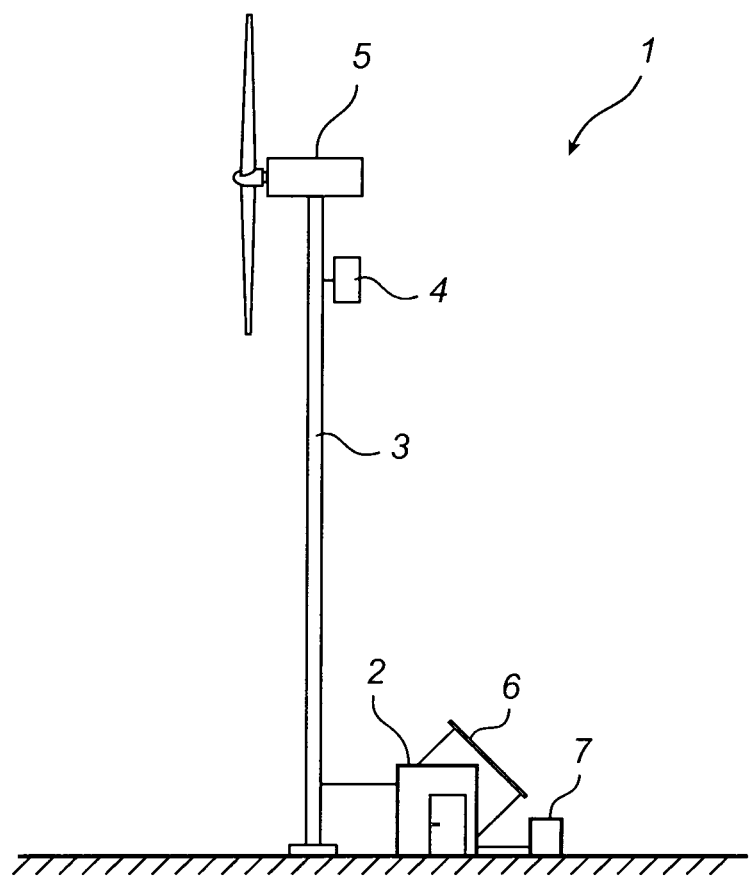
FIGS. 1a-b schematically illustrate an exemplary shelter for a base station in a wireless communication network.
Figure 1B:
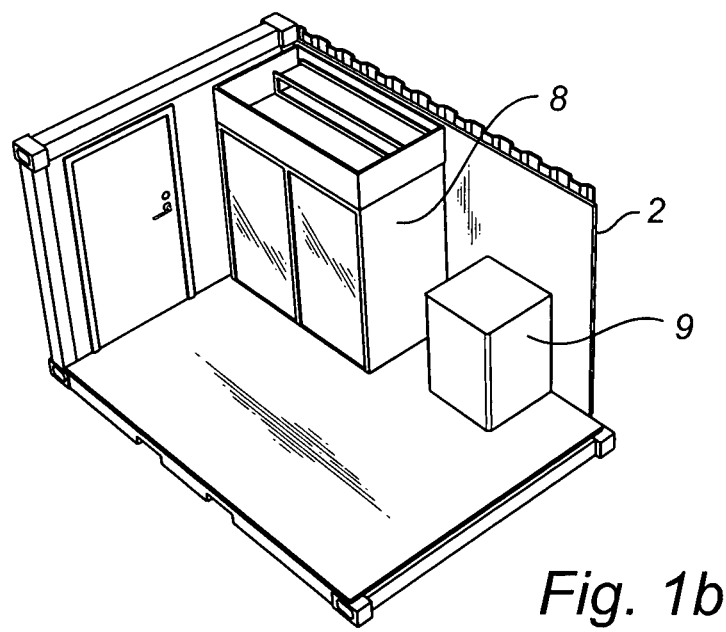

FIGS. 1a-b schematically illustrate an exemplary shelter according to an embodiment of the present invention for a base station in a wireless communication network. The term "shelter" is here used to denote not only the enclosure actually sheltering the telecommunication equipment of the base station, but also the system supplying power to the base station.

With reference to FIG. 1a, showing an outside overview thereof, the shelter 1 includes an enclosure 2 housing telecommunication equipment (not shown in FIG. 1), a mast 3 supporting transmission equipment such as one or several antennas 4 for radio communication and a climate-dependent power source in the form of a wind turbine 5. As is schematically shown in FIG. 1a, the shelter further includes an additional climate-dependent power source in the form of a solar panel 6 which is supported by the enclosure 2, and an auxiliary power source, here indicated as a diesel/biofuel generator 7.

As is schematically illustrated in FIG. 1b, showing an inside view of the enclosure 2 without any telecommunication equipment installed, the power supply system of the shelter 1 further includes an energy storage device provided in the form of a battery arrangement. This battery arrangement is housed in a heat-insulated enclosure 8, which is provided with a climate control system 9 for enabling cooling of the batteries. Depending on the type of batteries selected for the power supply system comprised in the shelter 1, cooling may be required to achieve the desired lifetime of the batteries, which may typically be in excess of 10 years.

The basic concept illustrated in FIGS. 1a-b is especially suitable for use in remote regions where it is not feasible to power the base station from the power grid. The concept may, however, also advantageously be used in more developed parts of the World, with the aim of reducing emission of green house gases caused by the power consumption of the base station.

Practically each site of deployment for a power supply system according to the present invention in general, and the base station shelter 1 schematically illustrated in FIGS. 1a-b in particular, has its own unique requirements on the power supply system. Furthermore, each power-consuming device, such as the telecommunication equipment in a base station, imposes specific requirements on the power supply system.

In order to provide a suitable system for each set of conditions or requirements, the basic concept of FIGS. 1a-b should be modified based on such considerations as, for example, the power requirements of the power-consuming device, the accessibility of the site, the climate conditions at the site, the type of auxiliary power that is available, the duty cycle requirements of the power-consuming device, and, finally, various cost issues.

Based on all of these requirements, the power supply system is dimensioned for the particular application. Based on a certain price of photovoltaic solar cells, average wind conditions at the site, local personnel costs, fuel cost etc, a particular mix of energy from the climate-dependent power source(s) and the auxiliary power source(s) is optimal. In various embodiments, this mix may typically be around 80% of the total average power over time from the climate-dependent power source(s) and 20% from the auxiliary power source(s). Of course, the size and other properties of the energy storage device are also parameters in the dimensioning process.

In the following, the power supply system 10 comprised in the shelter 1 of FIGS. 1a-b will be described with reference to the schematic block diagram in FIG. 2.

Figure 2:
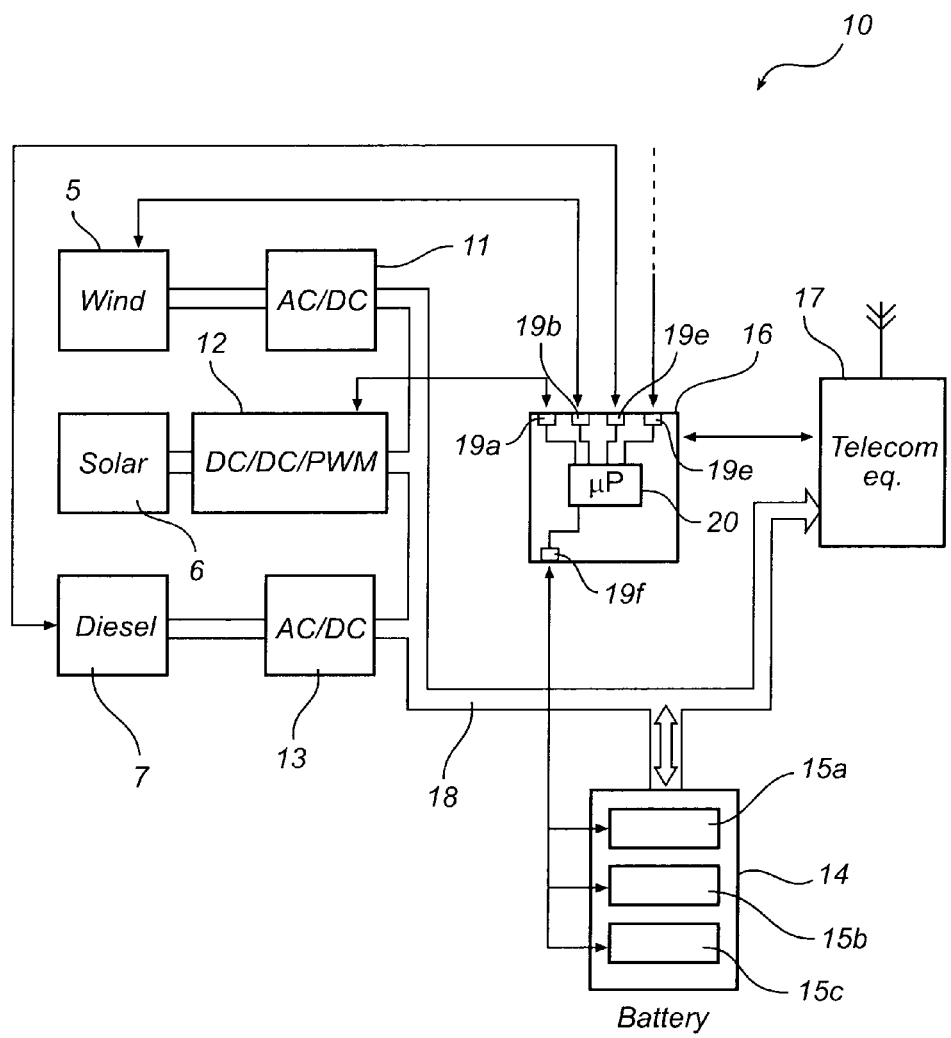
FIG. 2 is a block diagram schematically illustrating an embodiment of the power supply system according to the invention.

In FIG. 2, the wind turbine 5, the solar panel 6 and the diesel/biofuel generator 7 are represented by the correspondingly denoted boxes. Connected to each of these power sources 5, 6, 7, is power transforming equipment in the form of a 3-phase rectifier AC/DC converter 11 connected to the wind turbine 5, a DC/DC/PWM (pulse width modulation) inverter 12 connected to the solar panel 6 and a 1-phase or 3-phase rectifier AC/DC converter 13 connected to the diesel/biofuel generator 7. As is evident to the person skilled in the art, these power transformers may be provided as separate units or integrated with the respective power sources 5, 6 and 7.

As is illustrated in FIG. 2, the power supply system 10 further comprises a battery arrangement 14 comprising a plurality of independently controllable battery units 15a-c, a controller 16 for controlling operation of the power supply system 10. Furthermore, the power supply system is here shown connected to telecommunication equipment in the form of a base station 17.

As is indicated by the channel indication 18 in FIG. 2, power (in the form of electrical current) flows from the power sources 5, 6 and 7, via the power transformers 11, 12 and 13 to the base station 17. The battery 14 is connected to the power channel 18 and power may flow into the battery 14 or out of the battery 14 as controlled by the controller 16. Even though it is not specifically indicated in FIG. 2, it should be understood that power may be controlled to flow between the independently controllable battery units 15a-c comprised in the battery arrangement 14.

Furthermore, the controller 16 is connected to each of the power sources 5, 6, and 7, each of the battery units 15a-c and the telecom equipment 17, via a number input/output terminals (I/O:s) 19a-f, for acquisition of data and for control of the respective units. In the presently illustrated embodiment, the processing of acquired data and the generation of control signals for control of the respective units is performed by processing circuitry in the form of a micro-processor 20. Acquisition from other data sources is schematically indicated by the additional, partly dashed line in FIG. 2.

After now having described the basic configuration of an exemplary power supply system according to the present invention, an embodiment of the control method implemented by the controller 16 will now be described with reference to the schematic flow chart in FIG. 3. It is to be understood that the telecom equipment 17 is powered with solar/wind power whenever a sufficient supply of such power is available.

Figure 3:
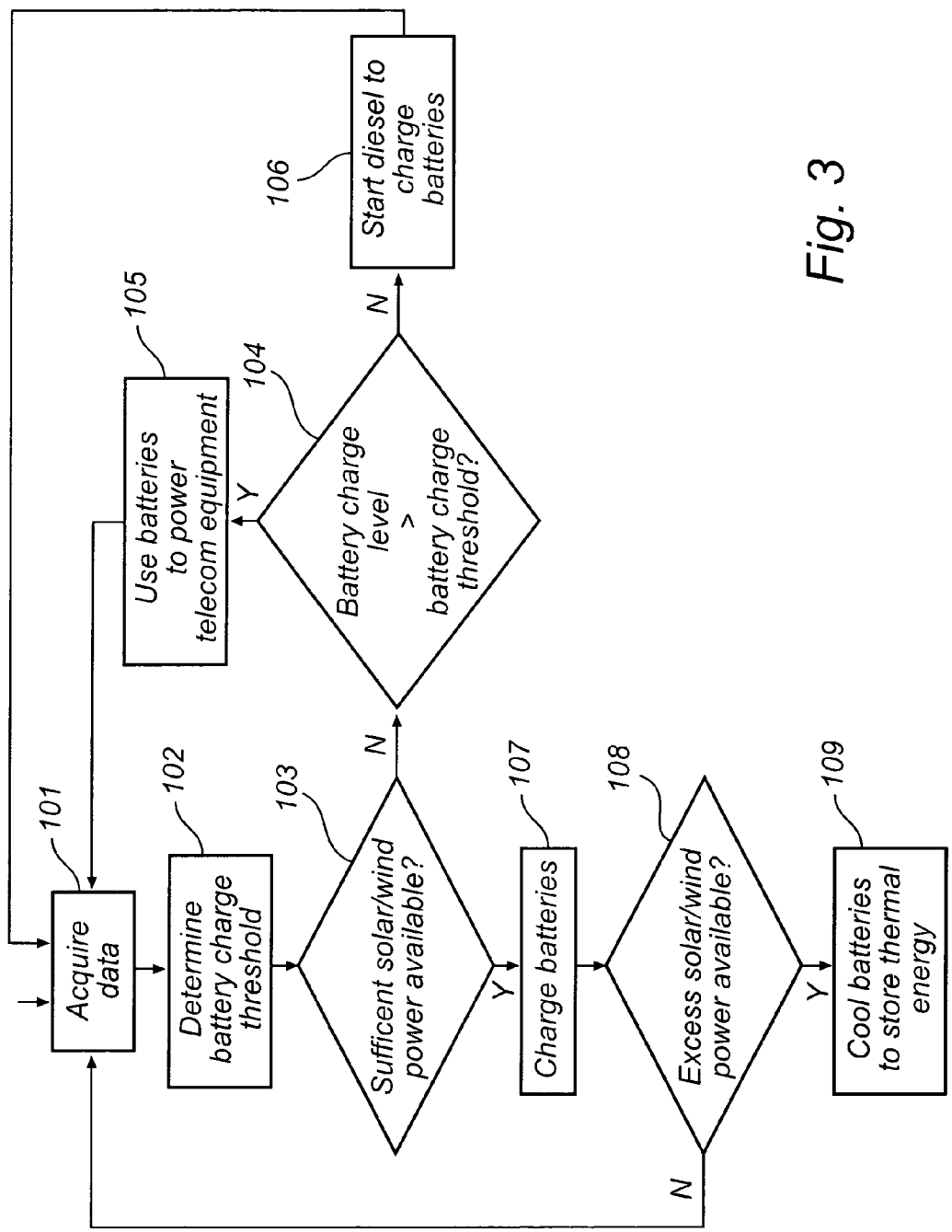
FIG. 3 is a flow-chart schematically illustrating a power supply control method according to an embodiment of the present invention.

Referring to FIG. 3, various data is acquired by the controller 16 in a first step 101. Such data includes data indicative of the expected power consumption of the power consumer 17, data indicative of the power supply by the climate-dependent power source(s) 5, 6, and data indicative of the charging status of the energy storage device 14. The acquired data may further include climate data, such as expected solar and/or wind conditions.

Based on the data acquired in step 101, a battery charge threshold is then determined in step 102. This battery charge threshold is the charge level at which the batteries should be charged in order to enable further operation of the telecommunication equipment given the acquired data.

In the next step 103, it is determined whether there is sufficient solar/wind power available to power the telecommunication equipment. If this is not the case, the method proceeds to step 104, where the current battery charge level is compared to the current battery charge threshold. If the battery charge level is higher than the threshold, the batteries are used to power the telecom equipment 17 in step 105, typically in co-operation with the climate-dependent power source. The process then returns to step 101 and acquires new data.

If, on the other hand, it is determined in step 104 that the current battery charge level is lower than the threshold, the diesel generator is started in step 106 to charge the batteries and, optionally, to directly power the telecommunication equipment 17. The process then returns to step 101 and acquires new data.

if, in step 103, it is instead determined that there is sufficient solar/wind power available, this power is used to charge the batteries in step 107. Since the charge current to the batteries is typically limited to increase life of the batteries, or the batteries may be full, it is determined in step 108 whether there is currently excess solar/wind power available.

If it is determined in step 108 that excess solar/wind power is available, the process continues to step 109 and uses the available solar/wind power to cool the batteries 14 in order to store thermal energy to enable saving energy at a later stage when solar/wind power may be scarce.

If it is determined in step 108 that there is no excess solar/wind power available, the process returns to step 101 and acquires new data.

By periodically running through the process of FIG. 3, the controller can optimize the performance of the power supply system to enable operation of the base station 17 while at the same time achieving a sufficient life for all of the major constituent components to make the shelter/base station site economically advantageous over life.

The person skilled in the art realizes that the present invention by no means is limited to the preferred embodiments described above. For example, the method may include steps for checking the available time of operation of the auxiliary source of electrical energy, in particular checking the fuel level, and supplying a signal indicative thereof. Such a signal may, for example, be used to prompt re-fuelling of the diesel/biofuel generator. Moreover, although the solar panel is here indicated as being supported by the enclosure of the shelter, it is readily understood that the solar panel may be supported by any other suitable structure.

The invention claimed is:

1. A method for controlling operation of a power supply system for supplying electrical power to a power consuming device, said power supply system comprising a climate-dependent source of electrical energy, an auxiliary source of electrical energy, and an energy storage device in electrical connection with said sources of electrical energy for storing electrical energy generated thereby, at least said climate-dependent source and said energy storage device being connectable to said power consuming device for supplying electrical energy thereto, wherein said method comprises:

acquiring power consumption data indicative of an expected future power consumption of said power consuming device, energy storage data indicative of a current energy storage level of said energy storage device, and power supply data indicative of a current supply of electrical power from said climate-dependent source of electrical energy;

supplying in response to insufficient power being available from said climate-dependent source, electrical power from said energy storage device to said power consuming device; and dynamically determining, based on said acquired power consumption data, energy storage data and power supply data, an energy storage threshold level at which electrical energy should be supplied to said energy storage device to enable future operation of said power consuming device without controlling the operation of the power consuming device.

2. A method according to claim 1, further comprising:
acquiring data indicative of an expected future supply of electrical power from said climate-dependent source of electrical energy.

3. A method according to claim 2, wherein said data comprises climate data.

4. A method according to claim 1, further comprising:
controlling, based on said acquired power consumption data, energy storage data and power supply data, an internal climate control system comprised in said power supply system to modify a temperature of at least a part of said power supply system to thereby store energy when more power is available from said climate-dependent source of electrical energy than is needed to power said power consuming device.

5. A method according to claim 1, further comprising:
controlling, based on said acquired power consumption data, energy storage data and power supply data, power consumption of said power supply system.

6. A method according to claim 1, further comprising individually controlling each of a plurality of sub-units comprised in the energy storage device.

7. A non-transitory controller comprising computer executable instructions implementing the method according to claim 1.

8. A controller for controlling a power supply system comprising a climate-dependent source of electrical energy, an auxiliary source of electrical energy, and an energy storage device in electrical connection with said sources of electrical energy for storing electrical energy generated thereby, at least said climate-dependent source and said energy storage device being connectable to a power consuming device for supplying electrical energy thereto, said controller comprising:

at least one input configured to receive power consumption data indicative of an expected future power consumption of said power consuming device, energy storage data indicative of an energy storage level of said energy storage device and power supply data indicative of a supply of electrical power from said climate-dependent source of electrical energy;

processing circuitry configured to dynamically determine, based on said received power consumption data, energy storage data and power supply data, an energy storage threshold level at which electrical energy should be supplied to said energy storage device to enable future operation of said power consuming device without controlling the operation of the power consuming device; and at least one output for sending control signals to said sources of electrical energy.

9. A controller according to claim 8, comprising an output for sending climate control signals to an internal climate control system comprised in said power supply system, said processing circuitry further being configured to generate said climate control signals based on said received power consumption data, energy storage data and power supply data.

10. A controller according to claim 8, further comprising at least one output for sending control signals to a plurality of sub-units comprised in the energy storage device for individually controlling charging and/or discharging thereof.

11. A power supply system, for supplying electrical power to a power consuming device, said power supply system comprising:

a climate-dependent source of electrical energy connectable to said power consuming device for supplying electrical energy thereto;

an auxiliary source of electrical energy connectable to said power consuming device for supplying electrical energy thereto;

an energy storage device that is in electrical connection with said sources of electrical energy for storing electrical energy generated thereby, and connectable to said power consuming device for supplying stored electrical energy thereto; and a controller connected to said sources of electrical energy and said energy storage device for controlling operation of the power supply system, said controller comprising: at least one input configured to receive power consumption data indicative of an expected future power consumption of said power consuming device, energy storage data indicative of an energy storage level of said energy storage device and power supply data indicative of a supply of electrical power from said climate-dependent source of electrical energy; processing circuitry configured to dynamically determine, based on said received power consumption data, energy storage data and power supply data, an energy storage threshold level at which electrical energy should be supplied to said energy storage device to enable future operation of said power consuming device without controlling the operation of the power consuming device; and at least one output for sending control signals to said sources of electrical energy.

12. A power supply system according to claim 11, comprising a further climate-dependent source of electrical energy.

13. A power supply system according to claim 11, wherein said climate-dependent source of electrical energy comprises at least one of a solar cell and a wind turbine.

14. A power supply system according to claims 11, wherein said energy storage device comprises a plurality of individually controllable sub-units.

15. A power supply system according to claim 11, comprising:

a wind turbine; a solar panel; and an auxiliary power source, each being connectable to the power-consuming device for supplying electrical power thereto;

an energy storage device being in electrical connection with the wind turbine, the solar panel and the auxiliary power source for storing electrical energy generated thereby, and connectable to the power-consuming device for supplying stored electrical energy thereto; and the controller being connected to the wind turbine, the solar panel, the auxiliary power source and the energy storage device, for controlling operation of the power supply system.

16. A power supply system according to claim 15, wherein said wind turbine is rotatably mounted on a supporting structure, and said controller is configured to control the power supplied by said wind turbine by rotating the wind turbine relative to the direction of the wind.

17. A shelter for telecommunication equipment, comprising:

an enclosure for housing the telecommunication equipment; and a power supply system according to claim 11 being connectable to said telecommunication equipment for providing power thereto.

18. A base station for deployment in a wireless communication network, comprising:

telecommunication equipment for enabling wireless communication; and a shelter according to claim 17 for housing and providing electrical power to said telecommunication equipment.

* * * * *